US009235526B2

(12) United States Patent
Klein

(10) Patent No.: US 9,235,526 B2
(45) Date of Patent: Jan. 12, 2016

(54) NON-VOLATILE HARD DISK DRIVE CACHE SYSTEM AND METHOD

(71) Applicant: Round Rock Research, LLC, Parsippany, NJ (US)

(72) Inventor: Dean A. Klein, Eagle, ID (US)

(73) Assignee: Round Rock Research, LLC, Parsippany, NJ (US)

( * ) Notice: Subject to any disclaimer, the term of this patent is extended or adjusted under 35 U.S.C. 154(b) by 0 days.

(21) Appl. No.: 14/484,827

(22) Filed: Sep. 12, 2014

(65) Prior Publication Data

US 2015/0006812 A1 Jan. 1, 2015

Related U.S. Application Data

(60) Division of application No. 13/108,805, filed on May 16, 2011, now Pat. No. 8,850,112, which is a continuation of application No. 11/219,324, filed on Sep. 1, 2005, now Pat. No. 7,966,450.

(51) Int. Cl.
*G06F 12/08* (2006.01)
*G06F 3/06* (2006.01)

(52) U.S. Cl.
CPC .......... *G06F 12/0866* (2013.01); *G06F 3/0604* (2013.01); *G06F 3/0646* (2013.01); *G06F 3/0685* (2013.01); *G06F 12/0804* (2013.01); *G06F 2212/2022* (2013.01); *G06F 2212/222* (2013.01); *G06F 2212/225* (2013.01); *G06F 2212/281* (2013.01); *Y02B 60/1225* (2013.01)

(58) Field of Classification Search
CPC .......... G06F 12/0866; G06F 2212/222; G06F 12/0804; G06F 11/1441; G06F 12/0897; G06F 12/0868; G06F 2212/214; G06F 3/0613; G06F 2212/2022; G06F 3/0685; G06F 11/1666; G06F 12/0246; G06F 12/0862; G06F 2212/281; G06F 3/0604; G06F 3/0646; H04L 67/1097; H04L 67/2852; H04L 41/08; H04L 41/0893; H04L 67/1002; H04L 67/1014; H04L 67/1025; H04L 67/2819; H04L 67/2842; H04L 67/28; H04L 29/06; H04L 65/1066; H04L 65/1069; H04L 67/1095; Y10S 707/99953; Y10S 707/99956
USPC ......................................... 711/113
See application file for complete search history.

(56) References Cited

U.S. PATENT DOCUMENTS

| 5,390,186 A | 2/1995 | Murata et al. |
| 5,590,298 A | 12/1996 | Kawamoto |
| 5,685,012 A | 11/1997 | Klein |
| 5,809,338 A | 9/1998 | Klein |
| 5,884,093 A | 3/1999 | Berenguel et al. |
| 5,890,211 A | 3/1999 | Sokolov et al. |

(Continued)

*Primary Examiner* — Yong Choe
(74) *Attorney, Agent, or Firm* — Lerner, David, Littenberg, Krumholz & Mentlik, LLP

(57) ABSTRACT

A non-volatile hard disk drive cache system is coupled between a processor and a hard disk drive. The cache system includes a control circuit, a non-volatile memory and a volatile memory. the control circuit causes a subset of the data stored in the hard disk drive to be written to the non-volatile memory. In response to a request to read data are stored in the non-volatile memory. If so, the requested read data are provided form the non-volatile memory. Otherwise, the requested read data are provided from the hard disk drive. the volatile memory is used as a write buffer and to store disk access statistics, such as the disk drive locations that are most frequently read, which are used by the control circuit to determine which data to store in the non-volatile memory.

11 Claims, 4 Drawing Sheets

(56) References Cited

U.S. PATENT DOCUMENTS

| | | |
|---|---|---|
| 5,915,260 A | 6/1999 | Sokolov |
| 5,920,887 A | 7/1999 | Sokolov et al. |
| 5,937,426 A | 8/1999 | Sokolov |
| 5,966,726 A | 10/1999 | Sokolov |
| 6,092,149 A | 7/2000 | Hicken et al. |
| 6,092,159 A | 7/2000 | Ekner et al. |
| 6,134,630 A | 10/2000 | McDonald et al. |
| 6,154,810 A | 11/2000 | Derby et al. |
| 6,189,080 B1 | 2/2001 | Ofer |
| 6,209,058 B1 | 3/2001 | Shats et al. |
| 6,249,854 B1 | 6/2001 | Fukuhisa et al. |
| 6,256,684 B1 | 7/2001 | Klein |
| 6,304,946 B1 | 10/2001 | Mason, Jr. |
| 6,321,293 B1 | 11/2001 | Fabrizio et al. |
| 6,408,357 B1 | 6/2002 | Hanmann et al. |
| 6,480,933 B1 | 11/2002 | Cargemel et al. |
| 6,490,651 B1 | 12/2002 | Shats et al. |
| 6,519,680 B2 | 2/2003 | Fujimoto et al. |
| 6,606,717 B1 | 8/2003 | Yu et al. |
| 6,629,200 B1 | 9/2003 | Kanamaru et al. |
| 6,745,266 B1 | 6/2004 | Johnson et al. |
| 6,748,487 B1 | 6/2004 | Takamoto et al. |
| 6,766,414 B2 | 7/2004 | Francis et al. |
| 6,772,288 B1 | 8/2004 | Flake et al. |
| 6,795,894 B1 | 9/2004 | Neufeld et al. |
| 6,862,660 B1 | 3/2005 | Wilkins et al. |
| 6,907,498 B2 | 6/2005 | Kitamura et al. |
| 6,922,833 B2 | 7/2005 | Forrer, Jr. |
| 6,944,717 B2 | 9/2005 | Yoneyama et al. |
| 6,961,814 B1 | 11/2005 | Thelin et al. |
| 6,968,425 B2 | 11/2005 | Hashimoto |
| 7,185,163 B1 | 2/2007 | Knight et al. |
| 7,340,593 B2 * | 3/2008 | Martin ................. 713/1 |
| 2002/0004885 A1 | 1/2002 | Francis et al. |
| 2002/0004887 A1 | 1/2002 | Kubo |
| 2002/0108019 A1 | 8/2002 | Allen et al. |
| 2004/0088481 A1 | 5/2004 | Garney |
| 2004/0103238 A1 | 5/2004 | Avraham et al. |
| 2004/0123068 A1 | 6/2004 | Hashimoto |
| 2004/0236908 A1 | 11/2004 | Suzuki et al. |
| 2004/0249966 A1 * | 12/2004 | Asazu et al. ............... 709/231 |
| 2004/0268053 A1 | 12/2004 | Fujisaki |
| 2005/0125606 A1 | 6/2005 | Garney |
| 2005/0144378 A1 | 6/2005 | Grover |
| 2005/0154962 A1 | 7/2005 | Grover et al. |
| 2005/0235108 A1 | 10/2005 | Hiratsuka |
| 2005/0251625 A1 | 11/2005 | Nagae et al. |
| 2005/0283648 A1 | 12/2005 | Ashmore |
| 2006/0072909 A1 | 4/2006 | Wang et al. |
| 2006/0265551 A1 | 11/2006 | Grandou et al. |
| 2007/0022242 A1 | 1/2007 | Cheng |

\* cited by examiner

NON-VOLATILE HARD DISK DRIVE CACHE SYSTEM AND METHOD

CROSS-REFERENCE TO RELATED APPLICATIONS

The present application is a divisional, of U.S. patent application Ser. No. 13/108,805, which was filed on May 16, 2011, and is scheduled to issue as U.S. Pat. No. 8,850,112, on Sep. 30, 2014, which is a continuation of U.S. patent application Ser. No. 11/219,324, which was filed on Sep. 1, 2005, which issued as U.S. Pat. No. 7,966,450 on Jun. 21, 2011, the disclosure of which is incorporated herein by reference.

TECHNICAL FIELD

This invention relates to computer systems, and, more particularly, to a system and method for making data stored on a computer system hard drive more quickly available to a processor or other access device.

BACKGROUND OF THE INVENTION

Computer or other processor-based systems normally store data, including program instructions, in one or more data storage devices. Data are written to and read from the data storage devices by a central processing unit ("CPU"), such as a microprocessor. An ideal data storage device would have a capacity to store a very large amount of data, it would be able to store and retrieve the data very quickly, and it would be relatively inexpensive in terms of cost per byte of data storage. Other factors that sometimes make a data storage device more desirable are low power consumption and non-volatility, which allows the data to be retained when power is removed from the system containing the data storage device. Unfortunately, the ideal data storage device does not exist. As a result, data storage devices are invariably involve a compromise between capacity, access speed, cost and other factors.

At the high end of the access speed capabilities are static random access memory ("SRAM") devices, which can be accessed very quickly. However, SRAM devices are relatively expensive because they consume a relatively large amount of area on a semiconductor die. SRAM devices are therefore not used where high data storage capacity is desired. Also, SRAM devices are inherently much more prone to radiation-induced errors. Dynamic random access memory ("DRAM") devices consume less area on a semiconductor die per byte of storage, and are therefore less expensive than SRAM devices. For these reasons DRAM devices are typically used for application, such as system memory, where higher data storage capacities and greater reliability are needed. Unfortunately, the access times of DRAM devices are significantly higher than the access times of SRAM devices, and they can consume a significant amount of power. Computer systems often balance the advantages and disadvantages of SRAM and DRAM devices by using DRAM devices as system memory, and using SRAM devices as cache memory to more quickly make available of subset of the data stored in system memory.

One disadvantage of both SRAM devices and DRAM devices is that they are volatile. As a result, any data stored in these devices is lost when power is removed from these memory devices. Flash memory devices have the advantages of being non-volatile, but they are more expensive and slower than both SRAM and DRAM devices.

In applications where high data storage capacity is required, a hard drive is generally used. Hard drives have the significant advantages of being able to store a vast amount of data and are thus far cheaper than SRAM or DRAM devices on a per byte basis. Hard drives also have the advantages of being non-volatile, and they can be configured to consume little or no power when the disk drive is not being accessed. Unfortunately, disk drives have the significant disadvantage of being very slow in comparison to SRAM and DRAM devices. In fact, the data access time of a disk drive is particularly high when accessing data that are not stored on the drive in a contiguous manner. As a result, the read/write head of the disk drive must be physically moved each time data stored at a different track are accessed. The high access times of a disk drive used in a computer system can severely limit the speed at which the computer system may function.

One approach that has been used to reduce the access time for disk drives, has been the use of SRAM or DRAM devices as write buffers for data that are written to disk drives and read caches for data that are read from disk drives. Using this approach, when data are read from the disk drive, the data are stored in the read cache. In response to a read request, the read cache is checked to determine if the requested read data are stored therein. If so, the read data are quickly supplied from the read cache. Otherwise, the read data are more slowly supplied from the disk drive and then stored in the read cache. The read cache therefore stores the data that have been most recently read from the disk drive. A read cache can greatly reduce the time required to access data stored in a disk drive. However, a read cache does not reduce disk access times when a system containing the disk drive is powered-up or otherwise initialized. In such case, the read cache will not contain any data, so all of the read data must be obtained from the disk drive. Yet the disk drive cannot provide any data until after the disk drive has spooled up, which typically requires at least 3-6 seconds.

For write accesses, the data to be written to the disk drive are first stored in the write buffer. As a result, data can be stored at the faster rate commensurate with the faster access times of these devices. During the time that data are written to the write buffer, power can be removed from the disk drive spindle motor, head actuator and associated components to reduce the power consumed by a system containing the disk drive. When the amount of data stored in the write buffer approaches the capacity of the write buffer, power is applied to the disk drive, and the data stored in the write buffer are transferred to the disk drive. The use of a write buffer thus provides the advantages of faster write access speed and lower power consumption. However, if power is inadvertently lost from a system using the write buffer, the write data are also lost.

There is therefore a need for a data storage device that has a very high storage capacity that is relatively inexpensive on a per byte basis, that is non-volatile to prevent the loss of write data, that can be configured to consume relatively little power, and that allows for quick data access.

DETAILED DESCRIPTION

Figure 1:
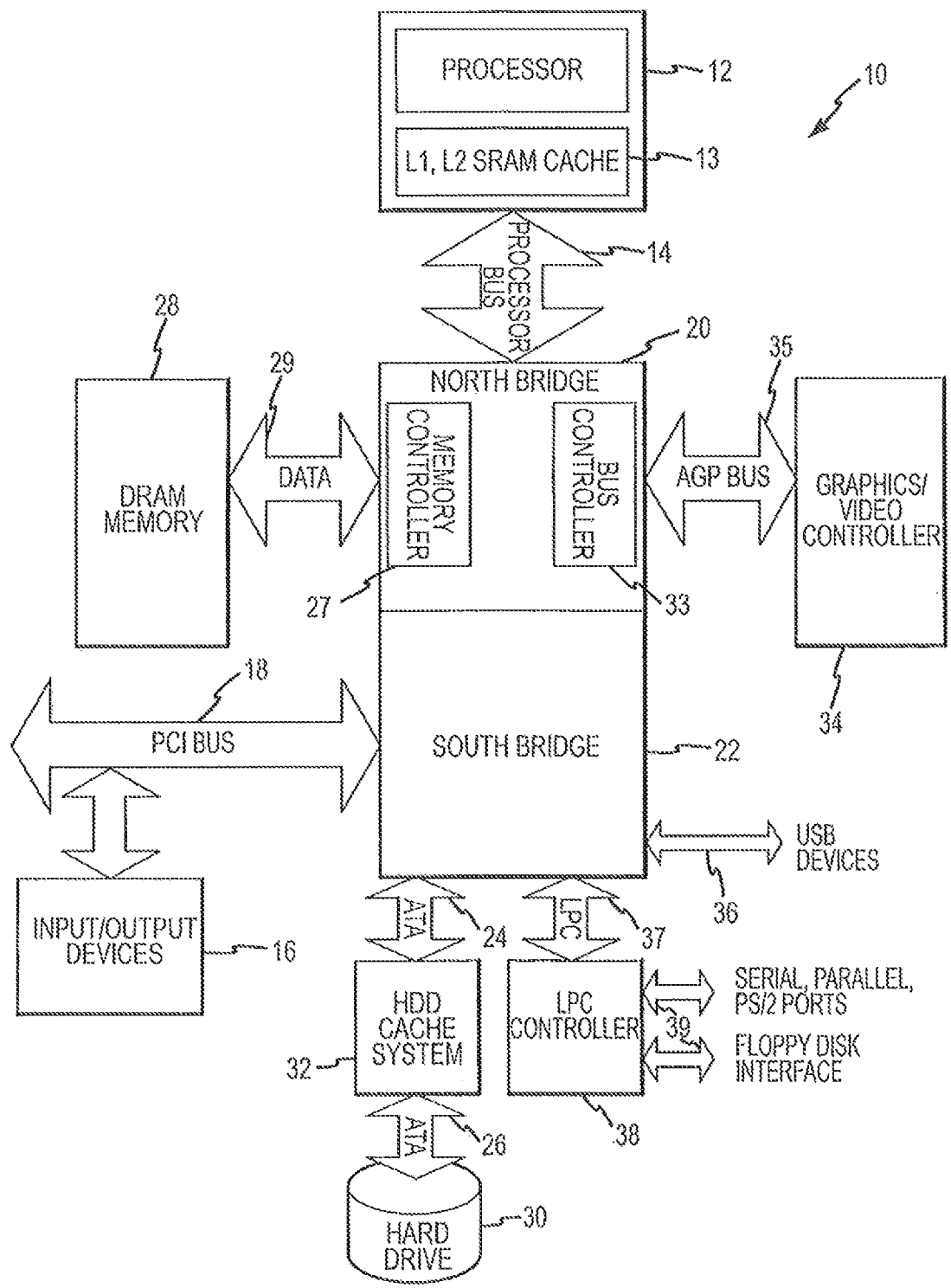
FIG. 1 is a block diagram of a computer system using a hard drive cache system according to one example of the invention.

A computer system 10 using a hard drive cache system according to one example of the invention is shown in FIG. 1. The computer system 10 includes a processor 12 for performing various computing functions, such as executing specific software to perform specific calculations or tasks. The processor 12 includes level 1 ("L1") and level 2 ("L2") SRAM caches 13 and a processor bus 14 that normally includes an address bus, a control bus, and a data bus. In addition, the computer system 10 includes one or more input/output devices 16, such as a keyboard, a mouse, or printer coupled to the processor 12 through a peripheral component interconnect ("PCI") bus 18, a pair of bus bridges 20, 22, and the processor bus 14. The bus bridge 20 is commonly referred to as a "north bridge," and it links the processor bus 14 with a peripheral bus (not shown) that is connected to the bus bridge 22, which is commonly referred to as a "south bridge." A hard drive 30 is also coupled to the processor 12 through the processor bus 14, bus bridges 20, 22, and a disk drive cache system 32. As explained in greater detail below, the disk drive cache system 32 allows data to be more quickly stored and retrieved from the disk drive 30. The disk drive cache system 32 interfaces with the bus bridge 22 through whatever type of bus structure the bus bridge 22 uses to interface with disk drives. In the example shown in FIG. 1, ATA buses 24, 26, which may be either a standard ATA or Serial ATA bus system, are used.

The bus bridge 20 includes a memory controller 27, which is used to couple the processor 12 to system memory 28 thorough a data bus 29. As mentioned above, the system memory 28 is generally implemented using DRAM devices. The bus bridge also includes a bus controller 33 that is used to couple the processor 12 to a graphics/video controller 34 through an accelerated graphics port ("AGP") bus 35. The graphics/video controller 34 normally drives a display device (not shown), such as a video monitor or LCD panel. The south bridge 22 is also coupled to universal serial bus devices (not shown) through a USB bus 36. Finally, the south bridge is also coupled to serial, parallel and PS/2 ports (not shown) and to a floppy disk interface (not shown) through an LPC bus 37, an LPC controller 38 and buses 39.

Figure 2:
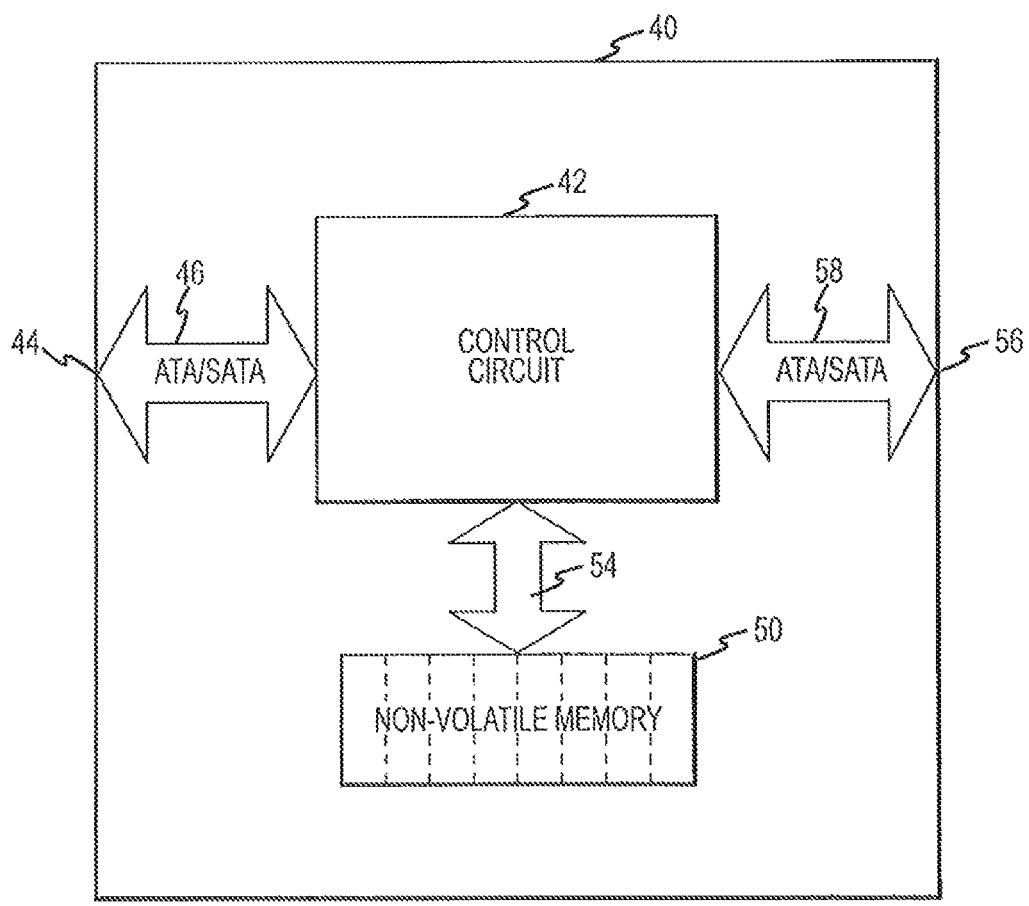
FIG. 2 is a block diagram of a disk drive cache system according to one example of the invention that may be used in the computer system of FIG. 1 or in some other processor-based system.

One example of a disk drive cache system 40 that may be used as the disk drive cache system 32 in the computer system 10 or some other processor-based system is shown in FIG. 2. The disk drive cache system 40 includes a control circuit 42 that is coupled to a first input/output ("I/O") port 44 through an appropriate bus 46. The I/O port 44 may be coupled to a disk drive access device, such as the system controller 20 (FIG. 1). The nature of the bus 46 will generally determined by the disk access device to which it is coupled. The bus 46 may be, for example, a standard ATA or Serial ATA bus.

The disk drive cache system 40 also includes a non-volatile memory 50 that is coupled to the control circuit 42 through an appropriate bus 54. The non-volatile memory 50 may be implemented with flash memory devices, such as NAND flash memory devices, or some other type of non-volatile memory device, including volatile memory, such as a DRAM device, powered by a back-up battery. The non-volatile memory 50 should have a read access times that is significantly less than the time required to access data stored on the hard disk drive 30 (FIG. 1).

The control circuit 42 is also coupled to a second I/O port 56 through an appropriate bus 58. The bus 58 may be the same as the bus 46 so that the disk drive cache system 40 may be simply inserted between a disk drive access device and the hard disk drive 30. As a result, using the disk drive cache system 40 does not require any modification of the disk drive access device or the hard disk drive 30.

In operation, the control circuit 42 routes memory requests, such as write data and read requests to access stored data, between the I/O port 44 and the I/O port 56. The control circuit 42 also routes selected write data to the bus 54 for storage in the non-volatile memory 50. For example, the data that are most frequently read or data that are specially tagged for caching may be stored in the non-volatile memory 50. The non-volatile memory 50 also stores a table identifying what data have been stored in the memory 50. In response to a read data request, the control circuit 42 first reads the table of stored data from the memory 50 to determine if the data requested by the read request are stored in the non-volatile memory 50. If so, the requested data are read from the non-volatile memory 50 rather than from the hard disk drive 30 (FIG. 1). Insofar as data can be accessed from the non-volatile memory 50 significantly faster than data can be accessed from the hard disk drive 30, the performance of any system using the disk drive cache system 40 is markedly improved. If the table indicates that the requested data are not stored in the disk drive 30, the read request is passed to the hard disk drive 30 to the I/O port 56 through the bus 58, and the requested data are provided by the hard disk drive that is connected to the I/O port 56.

The memory 50, being non-volatile, does not loose data if power in suddenly removed from a system containing the disk drive cache system 40 or if the disk drive 30 (FIG. 1) becomes inoperable. The use of non-volatile memory 50 also allows certain data to be present in the memory 50 at power-up. For example, a computer operating system, which is normally stored in the hard disk drive 30, may be permanently stored in the non-volatile memory 50. As a result, at power-on, the operating system can be loaded without waiting to access the operating system from the disk drive 30. Alternatively, the operating system can be transferred from the hard disk drive 30 to the non-volatile memory 50 as part of a power-off routine.

The identification of data that are to be cached may also be determined by an external disk drive access device rather than by the disk drive cache system 40. For example, an application being run by a processor may identify files or programs, such a dynamic link libraries, that are likely to accessed by the application. Running a word processing program might, for example, cause a dynamic link library for checking spelling to be automatically stored in the non-volatile memory 50. An application could also first read the data stored in a hard disk drive and then determine which of the stored data should be cached by writing the data to the non-volatile memory 50.

Figure 3:
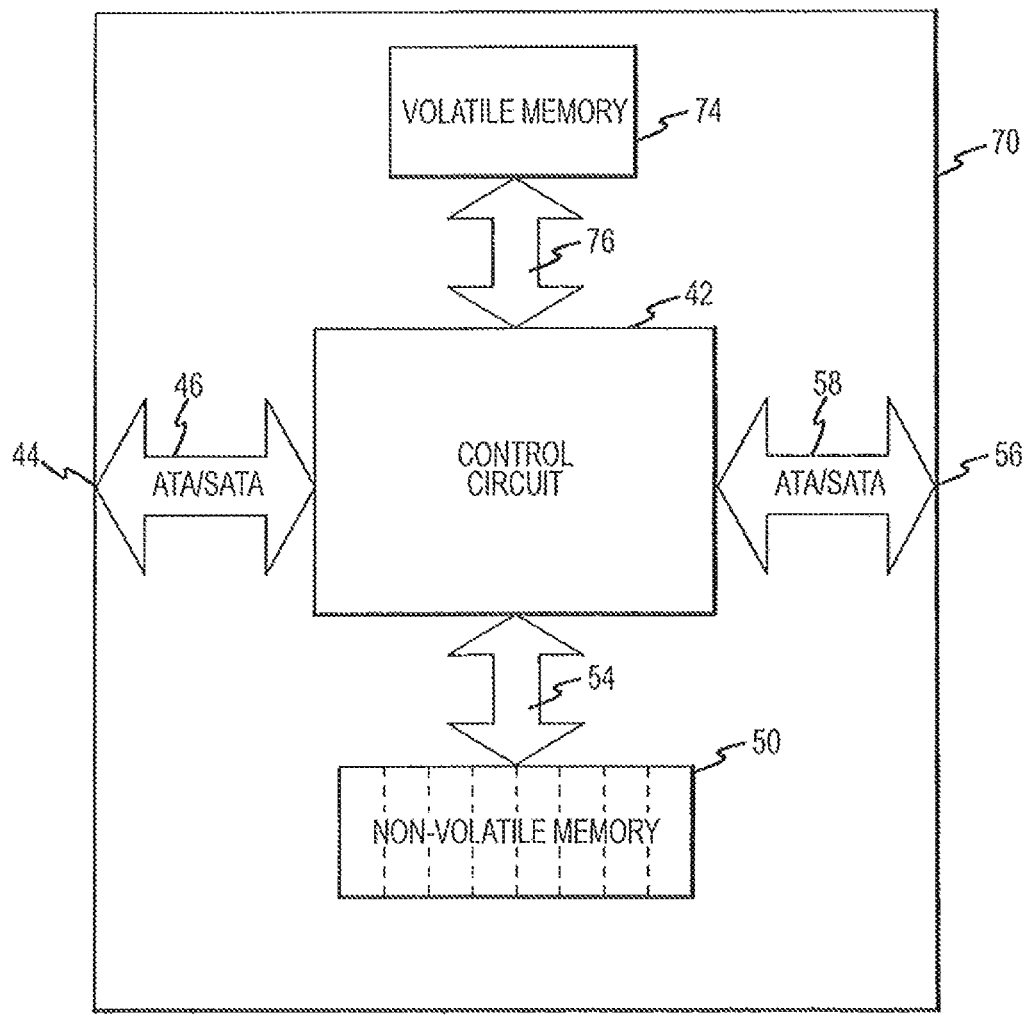
FIG. 3 is a block diagram of a disk drive cache system according to another example of the invention that may be used in the computer system of FIG. 1 or in some other processor-based system.

A disk drive cache system 70 according to another example of the invention is shown in FIG. 3. The system 70 differs from the disk drive cache system 40 by including a volatile memory 74, which is coupled to the control circuit 42 through a memory bus 76. The volatile memory 74 is preferably a DRAM device, but other volatile memory devices may also be used. The volatile memory 74 is preferably used for storing tables of disk access statistics, such as the identity of the sectors of the hard disk drive 30 that are most frequently being read. The tables stored in the volatile memory 74 may also indicate which of the most frequently read sectors are the sectors to which data are least frequently written, which makes the data stored therein most suitable for caching. The volatile memory 74 may also or alternatively be used as a write buffer for data that is to be stored in either the non-volatile memory 50 or the disk drive 30. As previously explained, buffering write data in this manner allows faster transfer of write data from a disk drive access device. The volatile memory may also be used as a buffer during the transfer of data into the non-volatile memory from the disk drive 30 or from the system CPU 12 of FIG. 1 or system memory 38 of FIG. 1 via bus 54 of FIG. 2.

Figure 4:
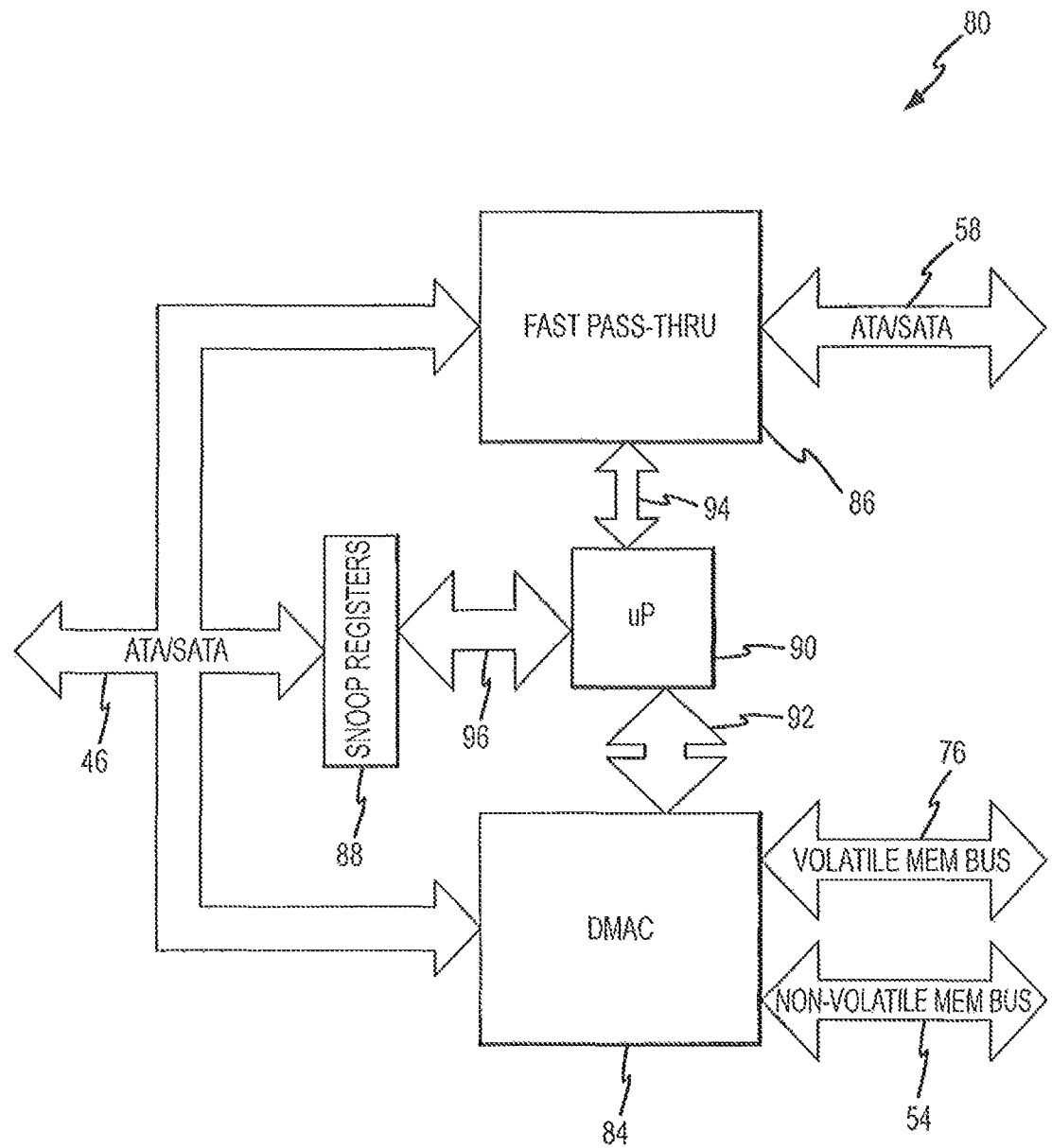
FIG. 4 is a block diagram of a control circuit according to one example of the invention that may be used in the disk drive cache systems shown in FIG. 2 or FIG. 3 or in a disk drive cache system according to another example of the invention.

A control circuit 80 according to one example of the invention is shown in FIG. 4. The control circuit 80 may be used as the control circuit 42 in the disk drive cache systems 40, 70 of FIGS. 2 and 3, respectively, or in a disk drive cache system according to some other example of the invention. The control circuit 80 includes direct memory access circuit 84 coupled to the I/O bus 46. The direct memory access circuit 84 transmits memory requests through the bus 54 to the non-volatile memory 50 volatile memory 76 or through the bus 76 to the volatile memory 76. These memory requests may be requests to read data from the non-volatile memory 50 or the volatile memory 76, or requests to write data to the non-volatile memory 50 or the volatile memory 76.

The control circuit 80 also includes a fast pass-through circuit 86 coupled between the I/O bus 46 and the I/O bus 58. The fast pass-through circuit 86 allows data access requests to pass through the control circuit 80 with minimal delay. The fast pass-through circuit 86 is also used to write data to the hard disk drive 30 (FIG. 1) and to read data from the hard disk drive 30 that is not stored in the non-volatile memory 50.

Also included in the control circuit 80 are snoop registers 88 and a microprocessor 90. The snoop registers 88 captures commands and addresses in disk access requests received from a processor or other disk access device. In response to detecting a captured read command, the snoop registers 88 pass the address captured with the read command to the microprocessor 90 through a bus 96. The microprocessor 90 then compares the captured address with the table of addresses stored in the non-volatile memory 50 that identify the cached data stored in the non-volatile memory 50. In the event of a match, the microprocessor 90 couples signals through a bus 92 to cause the direct memory access circuit 84 to read the requested data from the non-volatile memory 50, which is then passes to the disk access device requesting the data. In the event the captured address is not found in the table of addresses identifying cached data, the microprocessor 90 couples signals through a bus 94 to cause the fast pass through circuit 86 to provide the requested data.

In response to detecting a captured write command, the snoop registers 88 captures any special tag indicating that the write data should be cached along with the corresponding write data and the address indicating where the write data will be stored in the disk 18. The snoop registers 88 then pass the captured tag, write data and address to the microprocessor 90 through the bus 96. The microprocessor 90 responds to receipt of the tag by coupling signals through the bus 92 to cause the direct memory access circuit 84 to store the captured write data in the non-volatile memory 50 and to store the captured address in the table in the non-volatile memory 50. During this time, the fast pass-through circuit 86 can be storing the write data in the hard disk drive 18.

In a disk cache system according to another example of the invention, the microprocessor 90 transfers the table of addresses identifying the cached data from the non-volatile memory 50 to the volatile memory 76 during power-up initialization. The microprocessor 90 then compares the captured addresses for disk read accesses to the table of addresses stored in the volatile memory 76. A disk cache system according to this example of the invention may provide faster operation because volatile memories typically can be read more quickly than non-volatile memories.

In a disk cache system according to still another example of the invention, the microprocessor 90 transfers both the table of addresses identifying the cached data and the cached data from the non-volatile memory 50 to the volatile memory 76. The microprocessor 90 then compares the captured addresses for disk read accesses to the table of addresses stored in the volatile memory 76, and also fetches the cached data from the volatile memory 76. Storing both the table of addresses and the cached data in the volatile memory 76 may provide still faster operation for the reason indicated above.

In a disk cache system according to still another example of the invention, the table of addresses identifying the cached data is loaded from non-volatile memory 50 into a hardware look-up memory such as a Content Addressable Memory. The microprocessor 90 then presents the captured address for the disk read accesses to the Content Addressable Memory, which performs the comparison and indicates directly to the microprocessor the presence or absence of cached data. Such a comparison can occur very rapidly and would allow increased performance over the methods described above.

In a disk cache system according to this invention the algorithm used for determining what data should be cached may be a "most frequently read-least frequently written" algorithm. With such an algorithm the microprocessor 90 maintains and updates statistical data, such as a counter, on the addresses of disk read addresses. If a disk data write occurs to a given disk address, the counter could be reset. When the number of reads of a given disk address exceeds some threshold value, the processor 90 may then initiate a transfer of the disk data for that address into the non-volatile cache.

In a disk cache system according to this invention it may be determined that certain data, such as operating system boot code or certain application code, should be retained in the cache permanently. In this case such data may be marked as a permanent cache data and not subject to replacement. This determination may be made by the operating system or by a user program.

In a disk cache system according to this invention a portion of the non-volatile cache memory may be permanently assigned to operating system or application code while a portion of the non-volatile cache memory may be dynamically changed according to some algorithm such as a "most frequently read-least frequently written" algorithm.

Although the present invention has been described with reference to the disclosed embodiments, persons skilled in the art will recognize that changes may be made in form and detail without departing from the spirit and scope of the invention. Such modifications are well within the skill of those ordinarily skilled in the art. Accordingly, the invention is not limited except as by the appended claims.

The invention claimed is:

1. A method for providing data stored on a hard drive to a system processor, comprising:
   identifying data on a hard drive that is anticipated to be needed by a system processor,
   retrieving the identified data from a hard drive;
   storing the retrieved data in a non-volatile memory; and in response to receiving a request from the system processor to retrieve the identified data from the hard drive, providing the stored data from the non-volatile memory to the system processor, wherein the non-volatile memory stores information identifying the data stored in the non-volatile memory, and wherein the information identifying the data stored in the non-volatile memory is transferred to a volatile memory during initialization of the hard drive.

2. The method of claim 1, wherein the indentified data is a dynamic link library.

3. The method of claim 1, wherein the identified data is operating system files.

4. The method of claim 1, wherein the identified data is identified in response to an instruction from the system processor to tag the data for retrieval.

5. The method of claim 4, wherein an application being run by the system processor issues the instruction.

6. A cache system, comprising:
a non-volatile memory operable to store data;
a first interface circuit operable to request data from the non-volatile memory and to write data to the non-volatile memory;
a second interface circuit operable to request data from a storage device and to write data to the storage device;
a microprocessor operable to control the first and second interface circuits; and
wherein the microprocessor, in response to a data read command from a system processor to read data, determines whether the data to be read is stored in the non-volatile memory and if so, operates the first interface to provide the data from the non-volatile memory to the system processor and if the data to be read is not stored in the non-volatile memory, operates the second interface circuit to provide the data from the storage device to the system processor,
wherein the non-volatile memory stores information identifying the data stored in the non-volatile memory, and wherein the information identifying the data stored in the non-volatile memory is transferred to a volatile memory during initialization of the storage device.

7. The cache system of claim 6, further comprising capture registers operable to capture data read commands and data write commands from the system processor and provide the data read commands and data write commands to the microprocessor.

8. The cache system of claim 6, wherein the second interface circuit is a pass through circuit operable to pass read and write commands from the system processor to the hard drive without passing through the microprocessor.

9. The cache system of claim 6, wherein the second interface circuit is a pass through circuit operable to pass read and write responses from the hard drive to the system processor without passing through the microprocessor.

10. A method to start-up a computer, comprising:
storing at least a portion of an operating system in a non-volatile memory cache; and
retrieving the at least a portion of the operating system from the non-volatile memory cache upon power-up of the computer,
wherein the non-volatile memory cache stores information identifying the portion of the operating system stored in the non-volatile memory cache, and wherein the information identifying the portion of the operating system stored in the non-volatile memory cache is transferred to a volatile memory during initialization of the computer.

11. The method of claim 10, wherein the portion of the operating system is stored in a reserved location in the non-volatile memory cache.

* * * * *